Oct. 12, 1937.    W. E. BLOWNEY    2,095,853
ELASTIC FLUID POWER PLANT
Filed April 3, 1936

Inventor:
Walter E. Blowney,
by Harry E. Dunham
His Attorney.

Patented Oct. 12, 1937

2,095,853

UNITED STATES PATENT OFFICE 2,095,853

ELASTIC FLUID POWER PLANT

Walter E. Blowney, Schenectady, N. Y., assignor to General Electric Company, a corporation of New York Application April 3, 1936, Serial No. 72,573

4 Claims. (Cl. 60—104)

The present invention relates to elastic fluid power plants including boilers and elastic fluid engines such as turbines receiving elastic fluid from the boiler.

The object of my invention is to provide an improved construction and arrangement, together with an improved method of operating such plants whereby their efficiency, especially that of the elastic fluid engines, is increased.

For a consideration of what I believe to be novel and my invention, attention is directed to the following description and the claims appended thereto in connection with the accompanying drawing.

Figure 1:
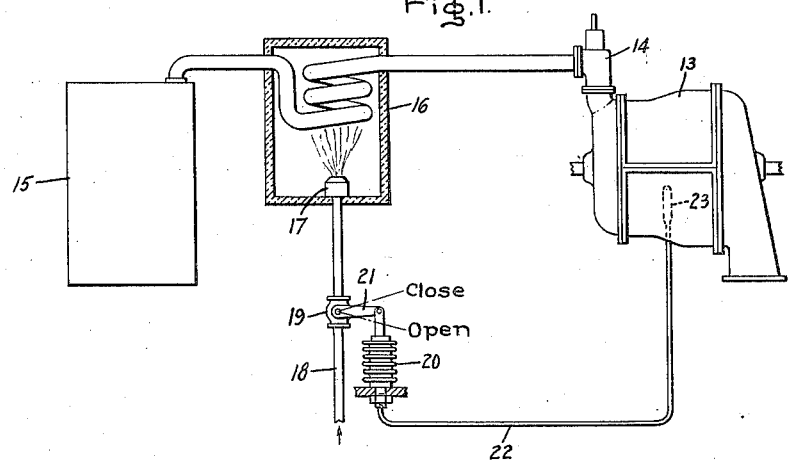
Figure 2:
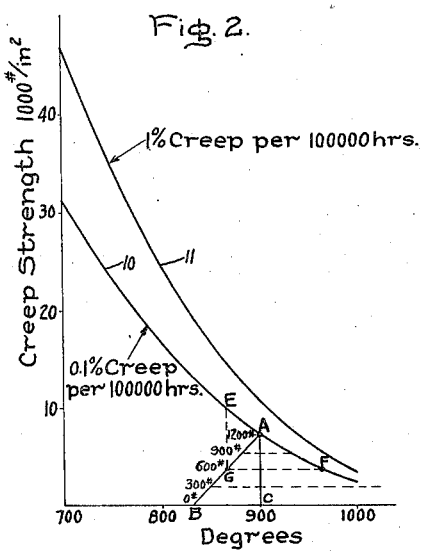

In the drawing, Fig. 1 represents a diagrammatic view of an elastic fluid power plant embodying my invention, and Fig. 2 illustrates an explanatory diagram of the operation of my improved arrangement.

An important point to be considered in the design of elastic fluid power plants, more especially in that of elastic fluid engines and other elements for receiving and conveying fluid at high pressure and temperature, is the creep strength of the material from which such engines or elements are made because the creep strength is one of the factors which determines and limits the maximum load to which such engines may be subjected during operation. Metals subjected to a stress, while at high temperatures, may slowly stretch or deform. This movement or stretch, or deformation may be so little that it is not observable at a short time test. Over a long period, however, it may cause an important change. The effect varies with the amount of stress and also with the temperature. Creep strength of the particular material being used in the manufacture of a machine, therefore, has to be taken into consideration in the design of such machine. Creep strength may be defined as the stress which will cause a deformation of steel or like material of 1% when subjected to the stress for a period of 100,000 hours. In the design of modern elastic fluid engines operated at pressures of the order of 1200 pounds per square inch and temperatures of the order of 900° F., one of the requirements usually is that the deformation of the material should not exceed the above mentioned creep strength, when subjected to full stress for 100,000 hours. For safety purposes, however, it is desirable to remain within a limit of .1 per cent of the aforementioned deformation. "Subjected to full stress" in the present instance means operated at full load. These engines may be operated at full load during a comparatively short time only and during the rest of the time may be operated at part load. Thus, only during a comparatively short time the material of the engines may be subjected to full stress because only during such comparatively short time are the pressure and the temperature of the elastic fluid supplied to the engine kept at a maximum. During part load conditions the practice heretofore has been to reduce the pressure of the elastic fluid to meet the reduced load demand which at the same time causes a drop of the temperature of the elastic fluid. Hence, the creep strength of the material is fully utilized only during full load condition but not during part load condition when the pressure of the elastic fluid supplied to the engine has been reduced. In order to utilize the full creep strength during part load condition or, from another viewpoint, in order to subject an elastic fluid engine to constant creep stress condition at varying load, I increase in accordance with my invention the temperature of the elastic fluid in response to decreasing demand for load and consequent decreasing pressure of the elastic fluid. Hence, the method of operating elastic fluid engines in accordance with my invention comprises the steps of decreasing the pressure of elastic fluid supplied to such engine in response to decreased demand for load output and simultaneously increasing the temperature of the elastic fluid supplied to such engine to a temperature at which the material of the engine is subject to full creep stress at the decreased pressure condition.

An arrangement of a power plant in accordance with my invention includes the provision of means for varying the temperature and the pressure of elastic fluid conducted to an elastic fluid engine in response to changes in demand for load output in such manner that the material of the engine is subject to full creep stress or, from another viewpoint, that the creep stress of the material is maintained at a maximum permissible value during varying load conditions.

Referring now to the explanatory diagram of Fig. 2, curve 10 represents the full creep strength in pounds per square inch plotted over the temperature in degrees Fahrenheit for a certain material with a permissible deformation of .1% per 100,000 hours of operation, and curve 11 represents the creep strength of the same kind of material with a permissible deformation of 1% over a period of 100,000 hours. Let us assume that the particular material characterized by the curves 10 and 11 is used in an elastic fluid turbine operated at full load by steam of 1200 pounds pressure and 900° F. and that the permissible creep be .1% per 100,000 hours. The normal operation of the turbine is indicated by A on the curve 10. As pointed out heretofore, part load on the turbine is normally obtained by reducing the steam pressure, preferably by means of control valves, to the lower pressure required in the turbine. The effect of this type of operation upon the stresses in the various affected parts of the turbine is illustrated in Fig. 2 by the straight line A—B. The aforementioned point A indicates that the maximum allowable stress is 7500 pounds per square inch for the particular material characterized by curve 10. With the present method of operating turbines, a drop in the initial pressure ahead of the first stage nozzle from 1200 to 600 pounds, for instance, causes a drop in steam temperature to approximately 866° F. This condition is indicated by a point G on the line A—B. Under this condition the strength of the material which is exposed to this pressure and temperature is shown at E on curve 10 and is equal to about 10,000 pounds per square inch. In other words, with the present method of operating steam turbines, the full strength of the material is only used to best advantage during full load condition, that is, when there is no throttling of the initial steam pressure. It is obvious that with such method of operation the turbine is not used at its best efficiency. Therefore, as pointed out above, in accordance with my invention, the temperature is increased as the pressure of the turbine drops. In the aforementioned example, where the pressure has dropped to 600 pounds per square inch as indicated at point G, the temperature would be increased to about 960° as illustrated by point F on curve 10 in order to maintain constant creep stress. Thus, the material under varying load conditions is subject to full creep stress, as indicated by the curve 10.

The method of operation in accordance with my invention may be accomplished by the arrangement illustrated in Fig. 1 where an elastic fluid turbine 13 has an inlet valve 14 for controlling the flow of elastic fluid supplied to the turbine from an elastic fluid generator. The elastic fluid generator in the present instance comprises a boiler or evaporator 15 connected in series with a superheater 16. The superheater includes a burner 17 to which fuel is supplied through a conduit 18 having a valve 19. With this arrangement the superheat may be controlled by opening or closing the valve 19. During operation a decrease in load output in response to a decrease in demand is effected by a closing of the throttle valve 14. This relieves the pressure of the elastic fluid conducted to the turbine to the desired value. In accordance with the invention, the creep stress is maintained constant during the reduced pressure condition by increasing the temperature of the elastic fluid conducted to the turbine. This is effected by opening of the valve 19 which may be accomplished manually or automatically as shown in the present instance by means including a temperature responsive device having a bellows 20 connected through a link 21 to the valve 19. The lower end of the bellows is connected to one end of a tube 22. The free end 23 of this tube is sealed and disposed within or adjacent the turbine casing to be subject to temperature changes of the elastic fluid passed through the turbine. Thus, with reference to the above example, a reduction in load requiring a reduction in pressure of from 1200 pounds to 600 pounds causes a drop in temperature from 900° to about 866° F. at the inlet of the turbine. This temperature drop reduces the temperature of the casing and thereby causes through the temperature responsive device 20, 22 opening of the valve 19 which in turn increases the flow of fuel through the conduit 18, causing the temperature of the elastic fluid at the inlet of the turbine to rise to about 960°. In the present example the drop in pressure from 1200 to 600 pounds causes an increase in temperature from 900 to 960° F. If the pressure at the inlet should drop from 1200 to 900 pounds, the temperature at the inlet would increase from 900 to about 930° by the action of the temperature responsive device 20, 22. It is to be noted that the curve 10 in the normal operating region between A, F has substantially straight line characteristics. It is further to be noted that the temperature responsive element 23 is provided near an intermediate stage of the turbine and not at the inlet thereof. This is important in order to accomplish the aforementioned results, namely, effect an increase in temperature of the elastic fluid supplied to the turbine in response to a decrease in load and a consequent decrease in inlet pressure. At such intermediate point the temperature responsive device 23 maintains constant temperature. With reference to the aforementioned example the temperature responsive device 23 may be provided at a point at which the temperature at normal load condition is 500° F., the temperature at the inlet under such load condition being 900° F. as pointed out above. If now the load drops, requiring a reduction in pressure of from 1200 lbs. to 600 lbs. at the inlet, corresponding to a drop in temperature from 900° to 866° F. at the inlet, the temperature at said intermediate point may drop from 500° to 480°. With applicant's control the temperature at the intermediate point is maintained constant and to do this in the present example necessitates an increase in temperature at the inlet beyond the original temperature of 900°. Specifically, as stated above, the inlet temperature must be raised to 960° in order to maintain a constant temperature of 500° at said intermediate point. The invention is not limited to elastic fluid turbines but is of equal significance in connection with other elastic fluid engines and more generally elastic fluid receiving and converting elements. In the above example, not only is the elastic fluid turbine utilized to its full creep strength, but also the conduit for conducting elastic fluid from the superheater 16 to the inlet of the turbine.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. The method of operating elastic fluid engines which comprises the steps of reducing the pressure of elastic fluid conducted to the engines in response to decreasing load demand and simultaneously increasing the temperature of the elastic fluid to subject the material of the engine to full creep stress during varying load conditions.

2. An elastic fluid power plant arrangement comprising an elastic fluid generator, a prime mover receiving elastic fluid from the generator, means for reducing the pressure of the elastic fluid conducted to the prime mover in response to decreases in load demand, and means for raising the temperature of the elastic fluid in the prime mover in response to decreases in pressure to subject the material from which the prime mover is made to full creep stress under varying load conditions.

3. An elastic fluid power plant including the combination of an elastic fluid generator, an elastic fluid engine connected to the generator to receive elastic fluid therefrom, and means for controlling both temperature and pressure of the elastic fluid conducted to the prime mover to subject the material from which the prime mover is made to full creep stress during varying load condition.

4. The method of operating conduits and other elements made from metal for receiving and conveying elastic fluid at fluctuating high pressure and high temperature, which method comprises the step of increasing the temperature in response to decreasing fluid pressure and vice versa.

WALTER E. BLOWNEY.